(12) United States Patent
Hanaoka

(10) Patent No.: US 12,488,239 B2
(45) Date of Patent: Dec. 2, 2025

(54) INPUT DATA GENERATION SYSTEM, INPUT DATA GENERATION METHOD, AND STORAGE MEDIUM

(71) Applicant: Resonac Corporation, Tokyo (JP)

(72) Inventor: Kyohei Hanaoka, Tokyo (JP)

( * ) Notice: Subject to any disclaimer, the term of this patent is extended or adjusted under 35 U.S.C. 154(b) by 821 days.

(21) Appl. No.: 17/774,889

(22) PCT Filed: Nov. 10, 2020

(86) PCT No.: PCT/JP2020/041973
§ 371 (c)(1),
(2) Date: May 6, 2022

(87) PCT Pub. No.: WO2021/095742
PCT Pub. Date: May 20, 2021

(65) Prior Publication Data
US 2022/0391699 A1    Dec. 8, 2022

(30) Foreign Application Priority Data

Nov. 12, 2019   (JP) .................................. 2019-204472

(51) Int. Cl.
*G16C 20/70*     (2019.01)
*G06N 3/00*      (2023.01)
(Continued)

(52) U.S. Cl.
CPC ............... *G06N 3/08* (2013.01); *G16C 20/30* (2019.02); *G16C 20/70* (2019.02)

(58) Field of Classification Search
CPC .. G06N 3/08; G06N 3/04; G06N 3/02; G06N 3/045; G06N 3/044; G06N 3/088;
(Continued)

(56) References Cited

U.S. PATENT DOCUMENTS 10,790,045 B1    9/2020   Goyal et al.
2006/0235670 A1*  10/2006  Vujasinovic ............. G16B 5/00
                                                703/11
(Continued)

FOREIGN PATENT DOCUMENTS

CA         2800722 A1 *  7/2013
CN         105778150      7/2016
(Continued)

OTHER PUBLICATIONS

Amitava Choudhury et al., "Structure prediction of multi-principal element alloys using ensemble learning", Engineering Computations, vol. 37, No. 3, Oct. 8, 2019, p. 1003-p. 1022.

(Continued)

*Primary Examiner* — Jeffrey P Aiello
(74) *Attorney, Agent, or Firm* — SOEI PATENT & LAW FIRM

(57) ABSTRACT

An input data generation system according to an embodiment includes at least one processor. The at least one processor receives at least an input of first molecular graph data specifying a molecular graph corresponding to a first molecule, second molecular graph data specifying a molecular graph corresponding to a second molecule, and mixing rate data indicating a mixing rate of each of the first molecule and the second molecule, generates synthetic molecular graph data by combining at least the first molecular graph data and the second molecular graph data, converts the synthetic molecular graph data into a feature vector, and generates input data for machine learning by reflecting the mixing rate data on the feature vector.

7 Claims, 6 Drawing Sheets

(51) Int. Cl.
   *G06N 3/04* (2023.01)
   *G06N 3/08* (2023.01)
   *G16C 20/30* (2019.01)
(58) Field of Classification Search
   CPC ...... G06N 3/042; G06N 3/0464; G06N 20/00;
   G06N 7/01; G06N 5/04; G16C 20/30;
   G16C 20/70; G16C 20/50; G16C 20/62;
   G16H 50/20; G16H 20/10; B01J
   2219/007; B01J 2219/00689; B01J
   2219/00695
   USPC .. 702/22, 30, 27, 19, 32, 23, 188, 179, 186,
   702/1; 703/11, 2, 12, 1, 6; 706/12, 45,
   706/21
   See application file for complete search history.

(56) References Cited

U.S. PATENT DOCUMENTS

| | | | |
|---|---|---|---|
| 2013/0179187 A1* | 7/2013 | Jackson | G16H 20/10 705/3 |
| 2017/0076041 A1* | 3/2017 | Zhou | G16B 5/00 |
| 2018/0360313 A1 | 12/2018 | Zhang | |
| 2019/0286791 A1* | 9/2019 | Takeda | G16C 20/30 |
| 2020/0160940 A1* | 5/2020 | Lafon | G16C 20/20 |
| 2020/0257933 A1 | 8/2020 | Steingrimsson et al. | |
| 2021/0073671 A1 | 3/2021 | Puri et al. | |
| 2022/0405049 A1 | 12/2022 | Hanaoka | |
| 2023/0051237 A1 | 2/2023 | Souly et al. | |
| 2024/0311692 A1 | 9/2024 | Tai et al. | |
| 2025/0174314 A1* | 5/2025 | Triendl | G06N 3/02 |

FOREIGN PATENT DOCUMENTS

| | | | | |
|---|---|---|---|---|
| CN | 107111786 | | 8/2017 | |
| CN | 107969156 A | * | 4/2018 | ......... G06F 18/2414 |
| CN | 109870533 | | 6/2019 | |
| JP | H7-227832 | | 8/1995 | |
| JP | H8-006646 | | 1/1996 | |
| JP | H08512159 A | * | 12/1996 | .......... B01J 19/0046 |
| JP | H9-259156 | | 10/1997 | |
| JP | H10-055348 | | 2/1998 | |
| JP | 2001-045307 | | 2/2001 | |
| JP | 2001-256420 | | 9/2001 | |
| JP | 2003-058582 | | 2/2003 | |
| JP | 2004-053440 | | 2/2004 | |
| JP | 2004-086892 | | 3/2004 | |
| JP | 2015-060237 | | 3/2015 | |
| JP | 2018-168580 | | 11/2018 | |
| JP | 2019-008571 | | 1/2019 | |
| JP | 2019-028879 | | 2/2019 | |
| JP | 2019-179319 | | 10/2019 | |
| KR | 20160037512 | | 4/2016 | |
| WO | 97/017659 | | 5/1997 | |
| WO | 2018/168580 | | 9/2018 | |
| WO | 2019/198644 | | 10/2019 | |
| WO | 2020/004575 | | 1/2020 | |

OTHER PUBLICATIONS

Han Min et al., "A Model for the Components of Materials Based on Neural Network Method", Journal of Building Materials, vol. 5, No. 4, Dec. 25, 2002.
Lin Tzyy-Shyang et al., "BigSMILES: A Structurally-Based Line Notation for Describing Macromolecules", ACS Central Science, vol. 5, No. 9, Sep. 12, 2019, p. 1523-p. 1531.
Minggang Zeng et al., "Graph Convolutional Neural Networks for Polymers Property Prediction", arxiv.org, Cornell University Library, 201 Olin Library Cornell University Ithaca, NY 14853, Nov. 15, 2018.
I. Oprisiu et al., "QSPR Approach to Predict Nonadditive Properties of Mixtures. Application to Bubble Point Temperatures of Binary Mixtures of Liquids", Molecular Informatics, vol. 31, No. 6-7, Jul. 6, 2012, p. 491-p. 502.
Extended Search Report in corresponding European Application No. 20886745.7, dated Mar. 2, 2023.
International Search Report dated Jan. 19, 2021 for PCT/JP2020/041902.
International Search Report dated Jan. 19, 2021 for PCT/JP2020/041905.
International Search Report dated Feb. 16, 2021 for PCT/JP2020/041973.
Soei Patent and Law Firm, Statement of Related Matters, dated Jun. 2, 2022.
International Preliminary Report on Patentability with Written Opinion dated May 27, 2022 for PCT/JP2020/041902.
International Preliminary Report on Patentability with Written Opinion dated May 27, 2022 for PCT/JP2020/041905.
International Preliminary Report on Patentability with Written Opinion dated May 27, 2022 for PCT/JP2020/041973.
Kyohei Hanaoka, "Deep Neural Networks for Multicomponent Molecular Systems", ACS Omega, vol. 5, No. 33, Aug. 10, 2020, p. 21042-p. 21053.
Dipendra Jha et al., "ElemNet: Deep Learning the Chemistry of Materials From Only Elemental Composition", Scientific Reports, vol. 8, No. 1, Dec. 4, 2018.
Dipendra Jha et al., "IRNet: A General Purpose Deep Residual Regression Framework for Materials Discovery", CCS '18: Proceedings of The 2018 ACM SIGSAC Conference on Computer and Communications Security, ACM Prss, New York, New York, USA, Jul. 25, 2019, p. 2385-p. 2393.
Elham Torabian et al., "New structure-based models for the prediction of flash point of multi-component organic mixtures", Thermochimica Acta, vol. 672, Nov. 16, 2018, p. 162-p. 172.
Rhys E. A. Goodall et al., "Predicting materials properties without crystal structure: Deep representation learning from stoichiometry", arxiv.org, Cornell University Library, 201 Olin Library Cornell University Ithaca, NY 14853, Oct. 1, 2019.
Extended Search Report in corresponding European Application No. 21757917.6, dated Jul. 3, 2023.
Wang Yu, et al., "Practical Technology and Application of Plastic Modification", Printing Industry Press, Jun. 30, 2014.
Pilania Ghanshyam et al., "Machine-Learning-Based Predictive Modeling of Glass Transition Temperatures: A Case of Polyhydroxyalkanoate Homopolymers and Copolymers", Journal of Chemical Information and Modeling, vol. 59, No. 12, Nov. 7, 2019, p. 5013-p. 5025.
Jinchao Liu et al., "Dynamic Spectrum Matching with One-shot Learning", arxiv.org, Cornell University Library, 201 Olin Library Cornell University Ithaca, NY 14853, Jun. 23, 2018.
Altae-Tran Han et al, "Low Data Drug Discovery with One-Shot Learning", ACS Central Science, vol. 3, No. 4, Apr. 26, 2017, p. 283-p. 293.
Jeon Minji et al, "ReSimNet: drug response similarity prediction using Siamese neural networks", Bioinformatics, vol. 35, No. 24, May 22, 2019, p. 5249-p. 5256.
Extended Search Report in corresponding European Application No. 20886405.8 dated Mar. 16, 2023.
Extended Search Report in corresponding European Application No. 20887729.0 dated Mar. 16, 2023.
International Preliminary Report on Patentability with Written Opinion dated Sep. 1, 2022 for PCT/JP2021/003767.
International Search Report dated Mar. 16, 2021 for PCT/JP2021/003767.
Soei Patent and Law Firm, Statement of Related Matters, dated Aug. 26, 2022.
Connor W. Coley et al., "Machine Learning in Computer-Aided Synthesis Planning", Accounts of Chemical Research, vol. 51, No. 5, May 1, 2018.
Lu Yanqiu et al., "Research on Molecular Weight and Distribution of Polyester during Polymerization Process", Coatings Technology & Abstracts, vol. 38, No. 2, Feb. 28, 2017.
Liang, Zhilong et al., "A Machine Learning Method for Material Property Prediction: Example Polymer Compatibility", arXiv.Org, arxiv.org/abs/2202.13554 (Year: 2022), Feb. 28, 2022.

* cited by examiner

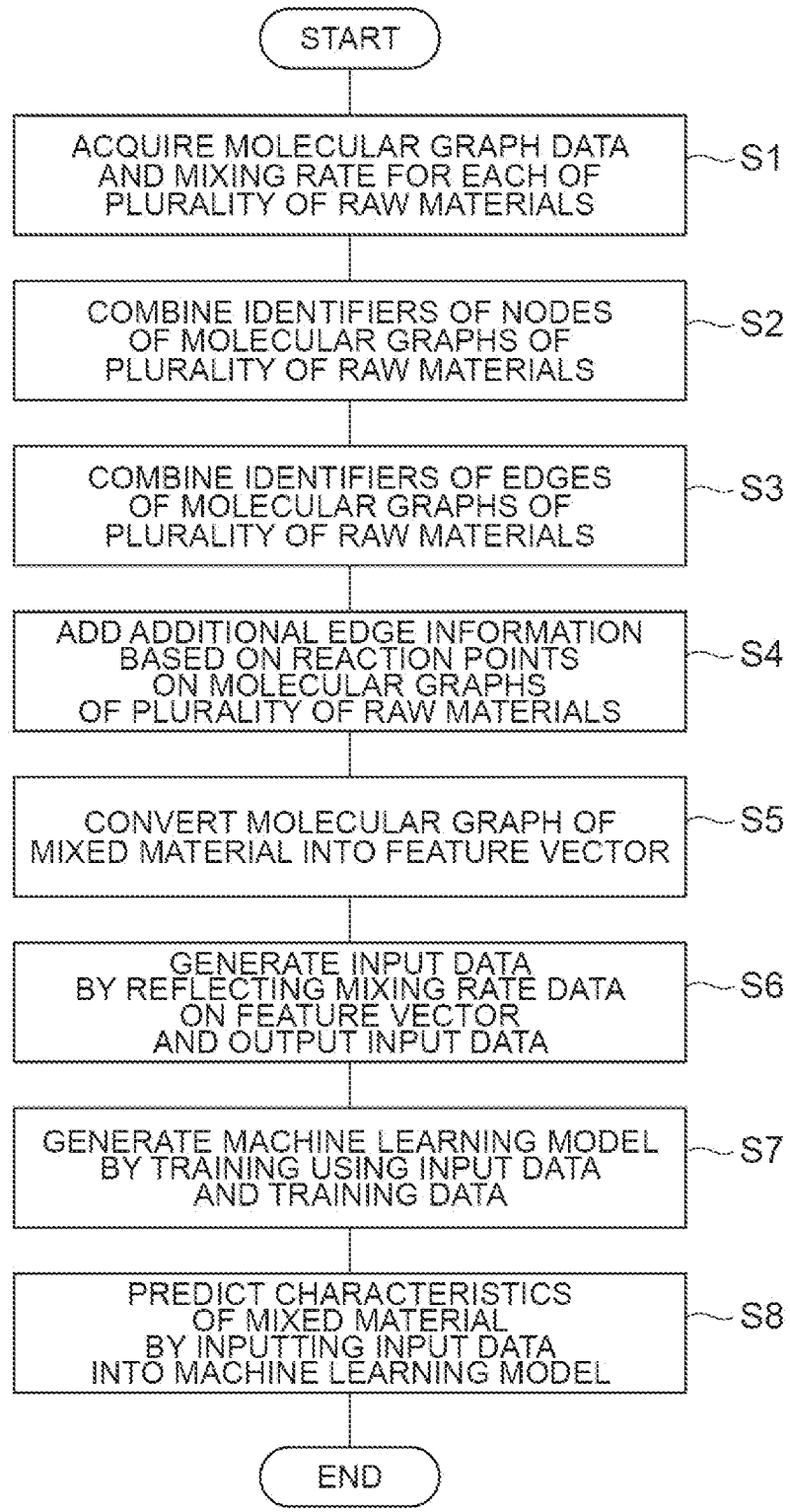

INPUT DATA GENERATION SYSTEM, INPUT DATA GENERATION METHOD, AND STORAGE MEDIUM

CROSS-REFERENCE TO RELATED APPLICATIONS

This application is a 35 U.S.C. § 371 national phase application of PCT/JP2020/041973, filed on Nov. 10, 2020, which claims priority to Japanese Patent Application No. 2019-204472, filed on Nov. 12, 2019.

TECHNICAL FIELD

One aspect of the present disclosure relates to an input data generation system, an input data generation method, and an input data generation program.

BACKGROUND ART

Conventionally, it has been practiced to acquire the structure of a molecule in a predetermined format, convert the structure into vector information, and input the vector information into a machine learning algorithm to predict its characteristics. For example, a method of predicting the connectivity between the three-dimensional structure of a biopolymer and the three-dimensional structure of a compound by using machine learning is known (see Patent Literature 1 below). In this method, a predicted three-dimensional structure of a complex of a biopolymer and a compound is generated based on the three-dimensional structure of the biopolymer and the three-dimensional structure of the compound, the predicted three-dimensional structure is converted into a predicted three-dimensional structure vector, and the connectivity between the three-dimensional structure of the biopolymer and the three-dimensional structure of the compound is predicted by determining the predicted three-dimensional structure vector using a machine learning algorithm.

CITATION LIST

Patent Literature

Patent Literature 1: Japanese Unexamined Patent Publication No. 2019-28879

SUMMARY OF INVENTION

Technical Problem

In recent years, a technique for predicting the characteristics of a substance by a neural network using a molecular graph as its input has been known. However, with this technique, it has not been realized to efficiently predict the characteristics of a multi-component substance in which a plurality of types of components are mixed at various compounding ratios. In addition, since it is generally difficult to know the three-dimensional structure of a multi-component substance in advance, it is not possible to predict the characteristics of the multi-component substance by using the method in Patent Literature 1 described above. Therefore, there has been a demand for a mechanism for efficiently predicting the characteristics of a multi-component substance in which a plurality of types of components are mixed.

Solution to Problem

An input data generation system according to an aspect of the present disclosure includes at least one processor. The at least one processor is configured to receive at least an input of first molecular graph data specifying a molecular graph corresponding to a first molecule, second molecular graph data specifying a molecular graph corresponding to a second molecule, and mixing rate data indicating a mixing rate of each of the first molecule and the second molecule, generate synthetic molecular graph data by combining at least the first molecular graph data and the second molecular graph data, convert the synthetic molecular graph data into a feature vector, and generate input data for machine learning by reflecting the mixing rate data on the feature vector.

Alternatively, an input data generation method according to another aspect of the of the present disclosure is an input data generation method executed by a computer including at least one processor. The input data generation method includes: receiving at least an input of first molecular graph data specifying a molecular graph corresponding to a first molecule, second molecular graph data specifying a molecular graph corresponding to a second molecule, and mixing rate data indicating a mixing rate of each of the first molecule and the second molecule; generating synthetic molecular graph data by combining at least the first molecular graph data and the second molecular graph data; converting the synthetic molecular graph data into a feature vector; and generating input data for machine learning by reflecting the mixing rate data on the feature vector.

Alternatively, an input data generation program according to another aspect of the present disclosure causes a computer to execute: receiving at least an input of first molecular graph data specifying a molecular graph corresponding to a first molecule, second molecular graph data specifying a molecular graph corresponding to a second molecule, and mixing rate data indicating a mixing rate of each of the first molecule and the second molecule; generating synthetic molecular graph data by combining at least the first molecular graph data and the second molecular graph data; converting the synthetic molecular graph data into a feature vector; and generating input data for machine learning by reflecting the mixing rate data on the feature vector.

According to the above described aspect, data specifying the molecular structure of the first molecule and data specifying the molecular structure of the second molecule are combined to generate synthetic molecular graph data, the synthetic molecular graph data is converted into a feature vector, and data representing the mixing rates of the first molecule and the second molecule is reflected on the feature vector to generate input data for machine learning. With such a configuration, it is possible to efficiently generate input data regarding a multi-component substance to be input to a neural network having a molecular graph as its input. As a result, even in the case of a multi-component substance containing a plurality of types of components, the characteristics of the multi-component substance can be predicted with high accuracy by processing the input data by the neural network.

Advantageous Effects of Invention

According to the aspect of the present disclosure, it is possible to predict the characteristics of a multi-component substance containing a plurality of types of components with high accuracy.

BRIEF DESCRIPTION OF DRAWINGS

FIG. 5 is a flowchart showing an example of the operation of the input data generation system according to the embodiment.

DESCRIPTION OF EMBODIMENTS

Figure 1:
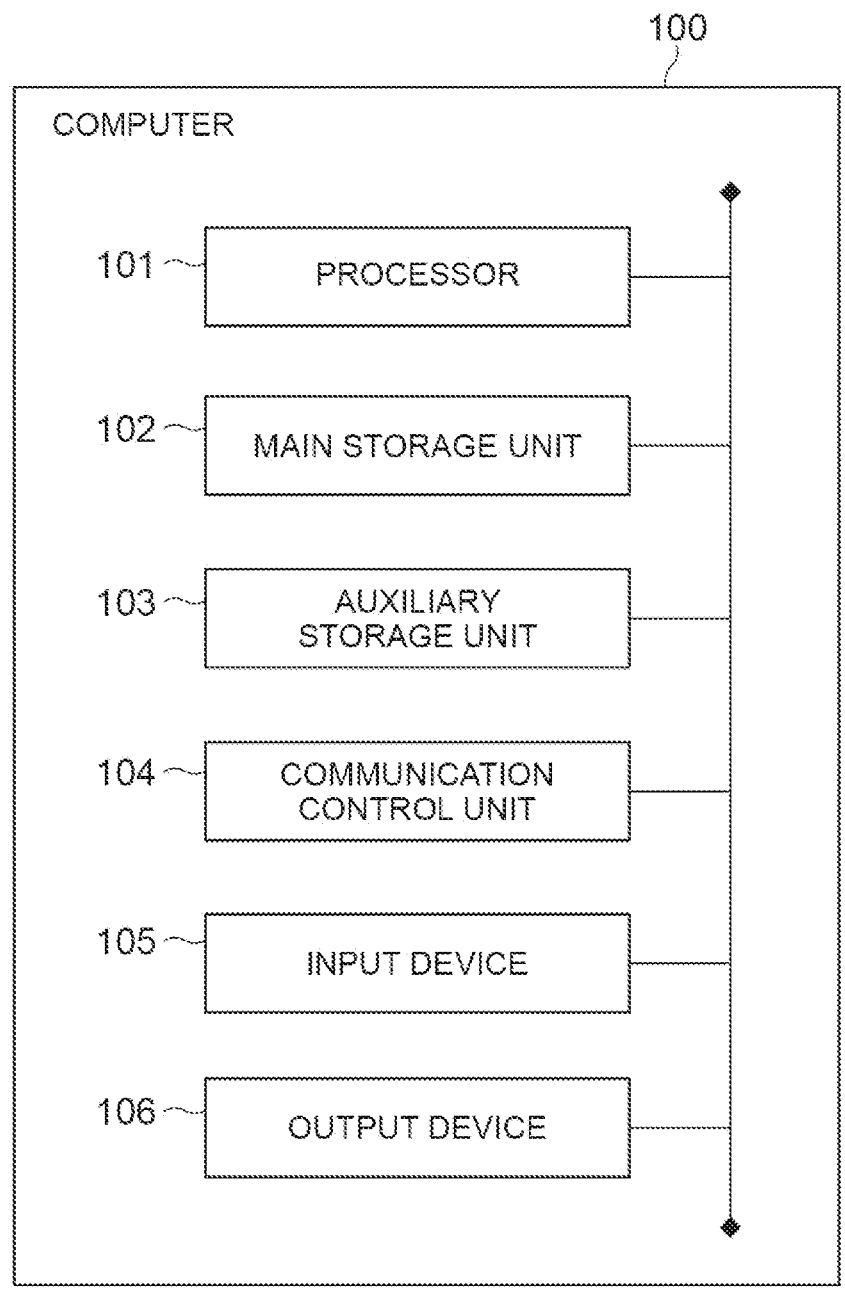
FIG. 1 is a diagram showing an example of the hardware configuration of a computer configuring an input data generation system according to an embodiment.

Hereinafter, an embodiment of the present invention will be described in detail with reference to the accompanying diagrams. In addition, in the description, the same elements or elements having the same function are denoted by the same reference numerals, and repeated description thereof will be omitted.

[System Overview]

An input data generation system 10 according to the embodiment is a computer system that performs a process of generating input data representing a multi-component substance generated by mixing a plurality of types of components at various mixing ratios. A component refers to a chemical substance having a specific molecular structure used to produce a multi-component substance. For example, the component is a monomer, a polymer, or a single molecule such as a small molecule additive, a solute molecule, or a gas molecule. One component may contain a plurality of types of molecules. A multi-component substance is a chemical substance produced by mixing a plurality of components at a predetermined mixing ratio. For example, the multi-component substance is a polymer alloy when the component is a monomer, a polymer blend when the component is a polymer, a mixed solution when the component is a solute molecule or solvent, and a mixed gas when the component is a gas molecule.

The input data generated by the input data generation system 10 is used as input data for machine learning to predict the characteristics of a multi-component substance. The characteristics of a multi-component substance are, for example, thermal properties such as glass transition temperature and melting point, mechanical properties, and adhesiveness when the multi-component substance is a resin. In addition, when the multi-component substance is another type of substance, the characteristics of a multi-component substance are the efficacy or toxicity of a drug, hazards such as the ignition point of combustibles, appearance characteristics, and appropriateness for a specific application. Machine learning, in which input data is input, is a method of autonomously finding a law or rule by iteratively learning based on given information. The specific method of machine learning is not limited. For example, the machine learning may be machine learning using a machine learning model that is a calculation model including a neural network. The neural network is an information processing model that imitates the mechanism of the human cranial nerve system. As a more specific example, machine learning uses at least one of a neural network having a graph as its input and a convolutional neural network having a graph as its input.

[System Configuration]

The input data generation system 10 is configured to include one or more computers. When a plurality of computers are used, one input data generation system 10 is logically constructed by connecting these computers to each other through a communication network, such as the Internet or an intranet.

FIG. 1 is a diagram showing an example of the general hardware configuration of a computer 100 configuring the input data generation system 10. For example, the computer 100 includes a processor (for example, a CPU) 101 for executing an operating system, an application program, and the like, a main storage unit 102 configured by a ROM and a RAM, an auxiliary storage unit 103 configured by a hard disk, a flash memory, and the like, a communication control unit 104 configured by a network card or a wireless communication module, an input device 105 such as a keyboard, a mouse, and a touch panel, and an output device 106 such as a monitor and a touch panel display.

Each functional element of the input data generation system 10 is realized by reading a predetermined program on the processor 101 or the main storage unit 102 and causing the processor 101 to execute the program. The processor 101 operates the communication control unit 104, the input device 105, or the output device 106 according to the program to perform reading and writing of data in the main storage unit 102 or the auxiliary storage unit 103. The data or database required for processing is stored in the main storage unit 102 or the auxiliary storage unit 103.

Figure 2:
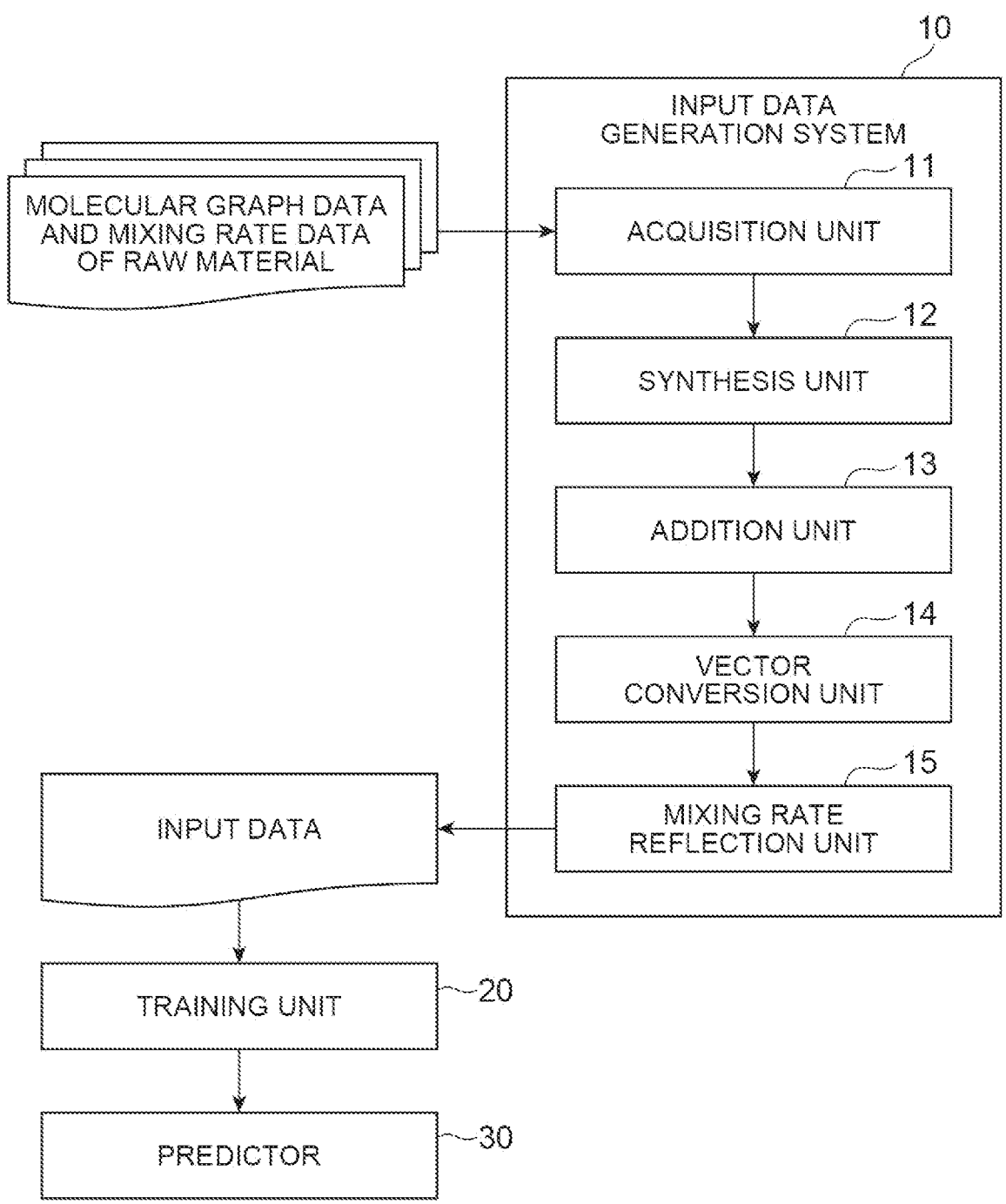
FIG. 2 is a diagram showing an example of the functional configuration of the input data generation system according to the embodiment.

FIG. 2 is a diagram showing an example of the functional configuration of the input data generation system 10. The input data generation system 10 includes an acquisition unit 11, a synthesis unit 12, an addition unit 13, a vector conversion unit 14, and a mixing rate reflection unit 15 as its functional elements.

The acquisition unit 11 is a functional element that receives an input of molecular graph data of a plurality of components and mixing rate data indicating the mixing rate of each of the plurality of components when it is assumed that the plurality of components are mixed to generate a mixture. The acquisition unit 11 may acquire the data from a database in the input data generation system 10 according to the selection input by the user of the input data generation system 10, or may acquire the data from an external computer or the like according to the user's selection.

Specifically, the acquisition unit 11 acquires at least first molecular graph data specifying a molecular graph corresponding to a first molecule contained in a first component and second molecular graph data specifying a molecular graph corresponding to a second molecule contained in a second component. The molecular graph data is data specifying the structure of an undirected graph in which the molecular structure is represented by nodes and edges. For example, the molecular graph data may be data specifying the structure of an undirected graph by numbers, letters, texts, vectors, and the like, or may be data that visualizes the structure by a two-dimensional image, a three-dimensional image, and the like, or may be any combination of two or more of these data. Each numerical value that makes up the molecular graph data may be represented in decimal or may be represented in other notations, such as a binary notation and a hexadecimal notation. More specifically, the acquisition unit 11 acquires at least the first molecular graph data specifying a molecular graph of a first monomer, which is the first component, and the second molecular graph data specifying a molecular graph of a second monomer, which is the second component.

Figure 3A:
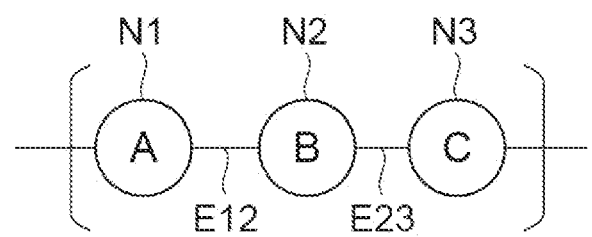
FIG. 3A or FIG. 3B is a diagram showing an example of a molecular graph specified by molecular graph data acquired by an acquisition unit 11 in FIG. 2.
Figure 3B:
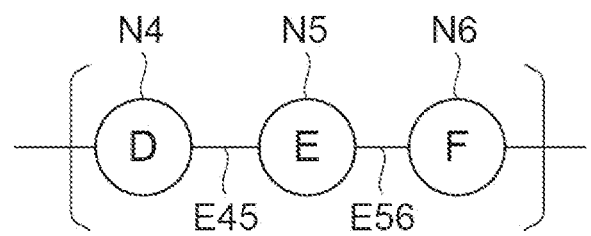

FIG. 3A shows an example of the structure of the first molecular graph, and FIG. 3B shows an example of the structure of the second molecular graph. The first molecular graph shown in FIG. 3A has a structure in which a node N1 of an atom "A" and a node N2 of an atom "B" are bonded to each other by an edge E12 and the node N2 and a node N3 of an atom "C" are bonded to each other by an edge E23. The first molecular graph data includes node information specifying each of the nodes N1 to N3 and edge information specifying each of the edges E12 and E23. In addition, in the first molecular graph, the node N1 and the node N3 are nodes having a property of being able to be further bonded to other nodes stochastically. For example, when the first molecular graph is a monomer having a straight-chain structure, the nodes N1 and N3 at the ends have a property of being able to be bonded stochastically. "Being able to be bonded stochastically" referred to herein means that being bonded to another node occurs stochastically, in other words, there may be a case of bonding and a case of no bonding. When the first molecular graph has such a node, the first molecular graph data also includes bondable node information specifying further bondable nodes (for example, the nodes N1 and N3). The bondable node information may include limitation information that limits a node to which the node is bonded or the type (atom or the like) of a node to be bonded.

Similarly, the second molecular graph shown in FIG. 3B has a structure in which a node N4 of an atom "D" and a node N5 of an atom "E" are bonded to each other by an edge E45 and the node N5 and a node N6 of an atom "F" are bonded to each other by an edge E56. The second molecular graph data includes node information specifying each of the nodes N4 to N6 and edge information specifying each of the edges E45 and E56. In addition, in the second molecular graph, as in the first molecular graph, the node N4 and the node N6 are nodes having a property of being able to be further bonded to other nodes. When the second molecular graph has such a node, the second molecular graph data also includes bondable node information specifying further bondable nodes. The bondable node information may include information that limits a node to which the node is bonded or the type of a node to be bonded.

In addition, as mixing rate data indicating the mixing rate r of a plurality of components, the acquisition unit 11 may acquire data indicating the mixing rate itself of each component, may acquire data indicating a mixing ratio between the plurality of components, or may acquire data indicating the mixing amount (weight, volume, or the like) of each of the plurality of components as an absolute value or a relative value. For example, the mixing rate $r_1$="0.5" of the first monomer, which is the first component, and the mixing rate $r_2$="0.5" of the second monomer, which is the second component, are acquired.

Figure 4:
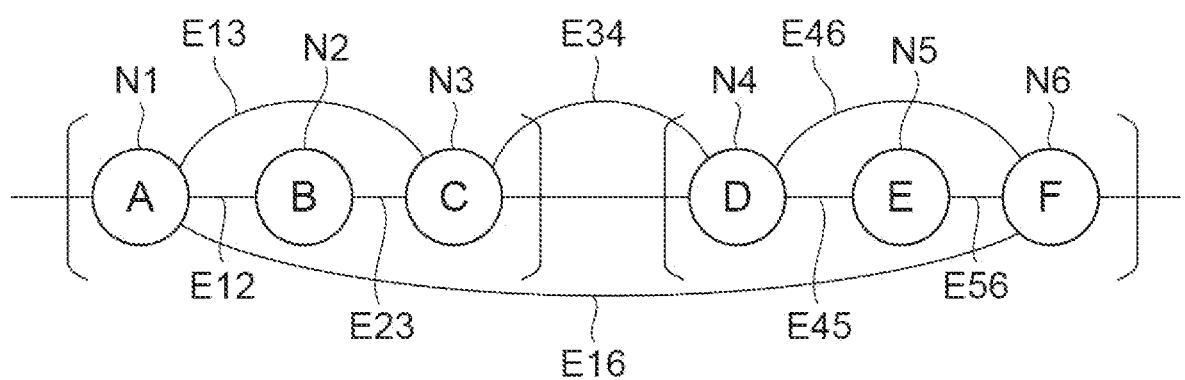
FIG. 4 is a diagram showing an example of a molecular graph of a multi-component substance produced by combining a first molecular graph and a second molecular graph shown in FIG. 3A or FIG. 3B by a synthesis unit 12 in FIG. 2.

The synthesis unit 12 combines molecular graphs of a plurality of components to generate synthetic molecular graph data corresponding to the molecular graph of a multi-component substance. Here, the synthesis unit 12 generates synthetic molecular graph data, which specifies a molecular graph of a multi-component substance in which the first molecular graph and the second molecular graph are combined, with reference to at least the first molecular graph data and the second molecular graph data. FIG. 4 shows an example of a molecular graph of a multi-component substance produced by combining the first molecular graph and the second molecular graph shown in FIG. 3A or FIG. 3B. As described above, the synthesis unit 12 generates synthetic molecular graph data by combining node information regarding the nodes N1, N2, and N3 and edge information regarding the edges E12 and E23 specified from the first molecular graph data and node information regarding the nodes N4, N5, and N6 and edge information regarding the edges E45 and E56 specified from the second molecular graph data as they are. Then, the synthesis unit 12 generates set data V that specifies a set of nodes in the generated synthetic molecular graph data and set data E that specifies a set of edges in the synthetic molecular graph data. For example, in the example of FIG. 4, the synthesis unit 12 generates the set data V={A, B, C, D, E, F}, and the set data E={AB, BC, DE, EF} by using an identifier for identifying the molecule of each node, and sets graph data G=(V, E) in which these set data V and E are combined as data representing the synthetic molecular graph data.

The addition unit 13 regenerates synthetic molecular graph data by adding, to the synthetic molecular graph data generated by the synthesis unit 12, additional edge information for bonding two nodes in the molecular graph of the multi-component substance specified by the synthetic molecular graph data. Specifically, the addition unit 13 extracts a combination of two nodes from further bondable nodes in the first molecular graph and further bondable nodes in the second molecular graph with reference to at least the bondable node information included in the first molecular graph data and the bondable node information included in the second molecular graph data. Then, the addition unit 13 adds additional edge information for bonding the extracted combinations of the nodes to the synthetic molecular graph data. For example, in the example of FIG. 4, the nodes N1, N3, N4, and N6 are designated as further bondable nodes. Therefore, the addition unit 13 adds additional edge information regarding an edge E13 that bonds the node N1 and the node N3 to each other, an edge E16 that bonds the node N1 and the node N6 to each other, an edge E34 that bonds the node N3 and the node N4 to each other, and an edge E46 that bonds the node N4 and the node N6 to each other. At this time, when extracting combinations of the nodes, the addition unit 13 may limit combinations that can be bonded to each other with reference to the limitation information included in the bondable node information, or may determine and extract combinations of atoms that can cause chemical bonds between the nodes. The molecular graph shown in FIG. 4 is an example in which the addition unit 13 extracts combinations with reference to the limitation information, and is an example in which the bonding destination of the node N1 is limited to the nodes N3 and N6 by the limitation information and the bonding destination of the node N3 is limited to the nodes N1 and N4 by the limitation information. Then, the addition unit 13 generates set data E' by adding an edge indicated by the additional edge information to the set data E in the synthetic molecular graph data, and sets graph data G'=(V, E') in which the set data V and E' are combined as data representing the synthetic molecular graph data. For example, according to the example of FIG. 4, the addition unit 13 generates the set data E'={AB, AC, AF, BC, CD, DE, DF, EF}.

The vector conversion unit 14 converts the graph data G' representing the synthetic molecular graph data generated by the addition unit 13 into a feature vector F. Specifically, when converting the set data V regarding the nodes included in the graph data G', the vector conversion unit 14 converts the set data V into vector elements by arranging numerical values representing the features of atoms that make up the nodes of the respective elements of the set data V in order. The numerical values representing the features of atoms are atomic number, electronegativity, and the like. In addition, when converting the set data E' regarding the edges included in the graph data G', the vector conversion unit 14 converts the set data E' into vector elements by arranging numerical values representing the features of the edges of the respective elements of the set data E' in order. The numerical values representing the features of edges are bond order, bond distance, and the like. The vector conversion unit 14 generates the feature vector F in which a vector element obtained by converting the set data V and a vector element obtained by converting the set data E' are included as separate vectors.

The mixing rate reflection unit 15 reflects mixing rate data on the feature vector F generated by the vector conversion unit 14, and generates input data for machine learning based on a feature vector f on which the mixing rate is reflected. That is, the mixing rate reflection unit 15 reflects the mixing rate r corresponding to the component for an element corresponding to the node of the molecular graph of the component among the elements of the feature vector F. For example, the mixing rate reflection unit 15 reflects the mixing rate $r_1$ of the first component configured by the first molecule for a vector element corresponding to the atom of the node of the first molecular graph, and reflects the mixing rate $r_2$ of the second component configured by the second molecule for a vector element corresponding to the atom of the node of the second molecular graph. In addition, the mixing rate reflection unit 15 reflects a mixing rate corresponding to the component for an element corresponding to the edge of the molecular graph of the component among the elements of the feature vector F. For example, the mixing rate reflection unit 15 reflects the mixing rate $r_1$ of the first component configured by the first molecule for a vector element corresponding to the edge of the first molecular graph, and reflects the mixing rate $r_2$ of the second component configured by the second molecule for a vector element corresponding to the edge of the second molecular graph. The reflection of the mixing rate is performed by multiplying each element of the vector elements by the mixing rate r, by adding the mixing rate r to each element of the vector elements, or by connecting the element of the mixing rate r to the vector elements.

In addition, for the vector element of the edge corresponding to the additional edge information added by the addition unit 13 among the vector elements of the feature vector F, the mixing rate reflection unit 15 reflects the mixing rate data as follows. That is, the mixing rate reflection unit 15 reflects the mixing rate r of one or two components corresponding to the molecular graph, to which the two nodes bonded to each other by the edge belong, on the vector element of the edge. That is, when the mixing rate of the component to which one node belongs is ri and the mixing rate of the component to which the other node belongs is rj, the mixing rate reflection unit 15 reflects a multiplication value ri×rj of the mixing rates ri and rj of the two components on the vector element of the edge. For example, when the corresponding edge bonds the nodes of one molecular graph to each other, the value of the square of the mixing rate r of the component corresponding to the one molecular graph is reflected on the vector element of the edge. When the corresponding edge bonds the nodes of two molecular graphs to each other, the multiplication value of the mixing rates r of the two components corresponding to the two molecular graphs is reflected on the vector element of the edge. In other words, when the corresponding edge bonds two nodes in the first molecular graph to each other, only the mixing rate $r_1$ of the component configured by the first molecule is reflected on the vector element of the edge. When the corresponding edge bonds the node of the first molecular graph and the node of the second molecular graph to each other, both the mixing rate $r_1$ of the first component configured by the first molecule and the mixing rate $r_2$ of the second component configured by the second molecule are reflected on the vector element of the edge. The reflection of the multiplication value of the mixing rates is performed by multiplying each element of the vector elements by the multiplication value of the mixing rates, by adding the multiplication value of the mixing rates to each element of the vector elements, or by connecting the element of the multiplication value of the mixing rates to the vector elements. The reflection of the mixing rates $r_1$ and $r_2$ of the two components is performed by reflecting the numerical value $r_1 \times r_2$ obtained by performing multiplication of the mixing rates of the two components.

In addition, the mixing rate reflection unit 15 outputs the generated input data to the outside. The output input data is read by a training unit 20 in a computer connected outside to the input data generation system 10. Then, in the training unit 20, the input data is input into a machine learning model as an explanatory variable together with an arbitrary training label, so that a trained model is generated. In addition, a machine learning model in a predictor 30 is set based on the trained model generated by the training unit 20. However, the training unit 20 and the predictor 30 may be the same functional unit. Then, the input data generated by the input data generation system 10 is input into the machine learning model in the predictor 30, so that the predictor 30 generates and outputs the prediction result of the characteristics of the multi-component substance. In addition, the training unit 20 and the predictor 30 may be configured in the same computer as the computer 100 configuring the input data generation system 10, or may be configured in a computer separate from the computer 100.

In one example, the machine learning model generated by the training unit 20 is a trained model that is expected to have the highest estimation accuracy, and therefore can be referred to as a "best machine learning model". However, it should be noted that the trained model is not always "best in reality". The trained model is generated by processing training data including many combinations of input data and output data with a computer. The computer calculates output data by inputting the input data into the machine learning model, and obtains an error between the calculated output data and output data indicated by the training data (that is, a difference between the estimation result and the ground truth). Then, the computer updates a predetermined parameter of the neural network, which is a machine learning model, based on the error. The computer generates a trained model by repeating such learning. The process of generating a trained model can be referred to as a learning phase, and the process of the predictor 30 using the trained model can be referred to as an operation phase.

[Operation of a System]

Figure 6A:
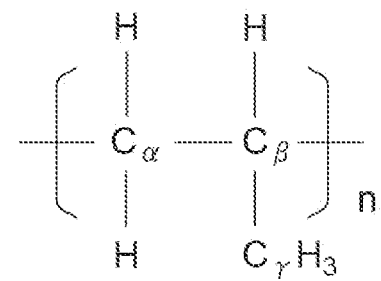
FIG. 6A or FIG. 6B is a diagram showing an example of molecular data handled in the operation of the input data generation system according to the embodiment.
Figure 6B:
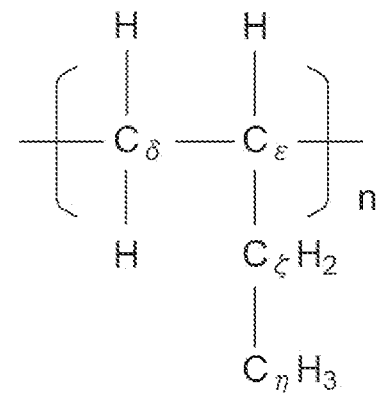

The operation of the input data generation system 10 and the input data generation method according to the present embodiment will be described with reference to FIGS. 5 and 6. FIG. 5 is a flowchart showing an example of the operation of the input data generation system 10. FIG. 6A or FIG. 6B is a diagram showing an example of molecular data handled in the operation of the input data generation system 10.

First, when an input data generation process is started with an instruction input of the user of the input data generation system 10 as a trigger, molecular graph data for each of a plurality of components and mixing rate data for each of the plurality of components are acquired by the acquisition unit 11 (step S1). At this time, at least the first molecular graph data specifying the molecular graph of the first molecule contained in the first component, the second molecular graph data specifying the molecular graph of the second molecule contained in the second component, and the mixing rate data for the first component and the second component are acquired by the acquisition unit 11. FIG. 6A shows an example of a molecular graph indicated by the first molecular graph data acquired by the acquisition unit 11, and FIG. 6B shows an example of a molecular graph indicated by the second molecular graph data acquired by the acquisition unit 11. In this example, polypropylene is exemplified as the first molecule and polybutylene is exemplified as the second molecule. For example, as the mixing rate data, the mixing rate $r_1$="0.5" of polypropylene as the first component and the mixing rate $r_2$="0.5" of polybutylene as the second component are acquired.

Thereafter, by the synthesis unit 12, synthetic molecular graph data regarding a mixture is generated by combining the molecular graph data of the plurality of components, and the set data V that specifies a set of nodes in the synthetic molecular graph data is generated by combining the pieces of information for identifying the node of each molecular graph (step S2). In addition, by the synthesis unit 12, the set data E that specifies a set of edges in the synthetic molecular graph data is generated by combining the pieces of information for identifying the edge of each molecular graph, and graph data G=(V, E) representing the synthetic molecular graph data is generated by combining the set data V and E (step S3). For example, in the examples of FIGS. 6(a) and 6(b), set data V1={$C_\alpha$, $C_\beta$, $C_\gamma$} of the nodes indicated by the first molecular graph data and set data V2={$C_\delta$, $C_\varepsilon$, $C_\zeta$, $C_\eta$} of the nodes indicated by the second molecular graph data are combined to generate set data V={$C_\alpha$, $C_\beta$, $C_\gamma$, $C_\delta$, $C_\varepsilon$, $C_\zeta$, $C_\eta$} of the nodes relevant to the synthetic molecular graph data. In addition, set data E1={$C_\alpha C_\beta$, $C_\beta C_\gamma$} of the edges indicated by the first molecular graph data and set data E2={$C_\delta C_\varepsilon$, $C_\varepsilon C_\zeta$, $C_\zeta C_\eta$} of the edges indicated by the second molecular graph data are combined to generate set data E={$C_\alpha C_\beta$, $C_\beta C_\gamma$, $C_\delta C_\varepsilon$, $C_\varepsilon C_\zeta$, $C_\zeta C_\eta$} of the edges relevant to the synthetic molecular graph data.

Then, by the addition unit 13, two edges (reaction points) that can be further bonded on the molecular graph of the plurality of components are extracted, and additional edge information for bonding these two reaction points to each other is added to the synthetic molecular graph data (step S4). At this time, the edges indicated by the additional edge information are added to the set data E by the addition unit 13, so that the set data E' specifying the set of edges in the synthetic molecular graph data is regenerated and graph data G'=(V, E') representing the synthetic molecular graph data in which the set data V and E' are combined is regenerated. For example, in the examples of FIGS. 6(a) and 6(b), the edges {$C_\alpha C_\delta$, $C_\beta C_\delta$, $C_\alpha C_\varepsilon$, $C_\beta C_\varepsilon$} indicated by the additional edge information are added to regenerate the set data E'={$C_\alpha C_\beta$, $C_\beta C_\gamma$, $C_\delta C_\varepsilon$, $C_\varepsilon C_\zeta$, $C_\zeta C_\eta$, $C_\alpha C_\delta$, $C_\beta C_\delta$, $C_\alpha C_\varepsilon$, $C_\beta C_\varepsilon$}.

In addition, the graph data G' representing the synthetic molecular graph data is converted into the feature vector F according to a predetermined conversion rule by the vector conversion unit 14 (step S5). As this conversion rule, for the elements of the set data V, arranging the features (for example, electronegativity and atomic number) representing the atoms of each element in vector elements is applied. For the elements of the set data E', arranging the features (for example, bond order and bond distance) representing the edges of each element in vector elements is applied. The feature vector F is generated by sequentially and one-dimensionally connecting the vectors converted from each element of the graph data G' to each other. For example, the element {$C_\alpha$} of the set data V is converted into a vector [12, 2.55] in which the atomic number and the electronegativity are arranged, and the element {$C_\alpha C_\beta$} of the set data E' is converted into a vector [1, 1.53] in which the bond order and the bond distance (angstrom) are arranged.

Thereafter, by the mixing rate reflection unit 15, mixing rate data is reflected on the feature vector F to generate the feature vector f. In addition, by the mixing rate reflection unit 15, the feature vector f and the synthetic molecular graph data are combined to generate input data, and the input data is output to the training unit 20 (step S6). When reflecting the mixing rate, for an element corresponding to the node and edge of the molecular graph of a component among the elements of the feature vector F, the mixing rate r of the component is reflected. For an element corresponding to the edge corresponding to the additional edge information among the elements of the feature vector F, the mixing rate r of the component to which two nodes connected to each other by the edge belong is reflected. For example, in the examples of FIGS. 6(a) and 6(b), for those other than the element corresponding to the edge corresponding to the additional edge information, the mixing rate $r_1$=$r_2$="0.5" is reflected. In the element corresponding to the edge corresponding to the additional edge information, when the two nodes connected to each other by the edge belong to the same molecular graph, the mixing rate $r_1^2$ (or $r_2^2$)="0.25" is reflected. When the two nodes connected to each other by the edge belong to different molecular graphs, the mixing rate $r_1 \times r_2$="0.25" is reflected. At this time, the reflection of the mixing rate is performed by multiplying each vector element by the mixing rate, by adding the mixing rate to each vector element, or by connecting the mixing rate to each vector element. For example, when the mixing rate is reflected by multiplying the vector element [12, 2.55] by the mixing rate r="0.5", [12×0.5, 2.55×0.5]= [6, 1.275] is set. In addition, for example, when the mixing rate is reflected by connecting the mixing rate r="0.5" to the vector element [12, 2.55], [12, 2.55, 0.5] is set.

Then, in the training unit 20, a learning phase is executed, and training using the input data and training data is repeated to generate a trained model (step S7). Then, the generated trained model is set in the predictor 30. By the predictor 30, an operation phase using the input data newly acquired from the input data generation system 10 is executed, and the prediction result of the characteristics of the multi-component substance is generated and output (step S8).

[Program]

An input data generation program for causing a computer or a computer system to function as the input data generation system 10 includes a program code for causing the computer system to function as the acquisition unit 11, the synthesis unit 12, the addition unit 13, the vector conversion unit 14, and the mixing rate reflection unit 15. The input data generation program may be provided after being fixedly recorded on a tangible recording medium, such as a CD-ROM, a DVD-ROM, or a semiconductor memory. Alternatively, the input data generation program may be provided through a communication network as a data signal superimposed on a carrier wave. The provided input data generation program is stored in, for example, the auxiliary storage unit 103. Each of the functional elements described above is realized by the processor 101 reading the input data generation program from the auxiliary storage unit 103 and executing the input data generation program.

(Effect)

As described above, according to the embodiment described above, data specifying the molecular structure of the first molecule and data specifying the molecular structure of the second molecule are combined to generate synthetic molecular graph data, the synthetic molecular graph data is converted into a feature vector, and data representing the mixing rates of the first molecule and the second molecule is reflected on the feature vector to generate input data for machine learning. With such a configuration, it is possible to efficiently generate input data regarding a multi-component substance to be input into a neural network having a molecular graph as its input. As a result, even in the case of a multi-component substance containing a plurality of types of components, the characteristics of the multi-component substance can be predicted with high accuracy by processing the input data by the neural network. In particular, the characteristics of the polymer alloy produced by mixing the monomers can be predicted with high accuracy.

In addition, in the embodiment described above, by reflecting the mixing rate of the molecule in the node information that is the information of the atoms configuring the molecule of the component, it is possible to appropriately generate the input data representing the multi-component substance. As a result, it is possible to predict the characteristics of the multi-component substance with higher accuracy. In particular, by multiplying the vector corresponding to the node information of the molecular graph data by the mixing rate of the component, by adding the mixing rate of the component to the vector corresponding to the node information of the molecular graph data, or by connecting the mixing rate of the component to the vector corresponding to the node information of the molecular graph data, it is possible to easily and appropriately reflect the mixing rate in the input data representing the multi-component substance.

In addition, in the embodiment described above, by reflecting the mixing rate of the molecule in the edge information that is the bond information between the atoms configuring the molecule of the component, it is possible to appropriately generate the input data representing the multi-component substance. As a result, it is possible to predict the characteristics of the multi-component substance with higher accuracy. In particular, by multiplying the vector corresponding to the edge information of the molecular graph data by the mixing rate of the component, by adding the mixing rate of the component to the vector corresponding to the edge information of the molecular graph data, or by connecting the mixing rate of the component to the vector corresponding to the edge information of the molecular graph data, it is possible to easily and appropriately reflect the mixing rate in the input data representing the multi-component substance.

In addition, in the embodiment described above, bond information between the atoms that can be bonded to each other in the multi-component substance can be generated as additional edge information. Therefore, by reflecting the mixing rate of the molecule in the additional edge information, it is possible to appropriately generate the input data representing the multi-component substance. As a result, it is possible to predict the characteristics of the multi-component substance with higher accuracy. In particular, in the case of a polymer alloy having randomness in the order of monomers, such as a copolymer, it is difficult to construct a molecular graph to be input with a neural network using a conventional graph as its input. In the present embodiment, by expressing the multi-component substance, such as a "polymer alloy", as a graph by reflecting chemical bonds between monomers on the molecular graph, it is possible to efficiently input the graph of the multi-component substance to the neural network.

In addition, in the embodiment described above, a neural network having a graph as its input is adopted as a model for machine learning. As a result, the characteristics of the multi-component substance can be predicted with high accuracy by inputting the molecular graph data.

Modification Examples

The present invention has been described in detail based on the embodiment. However, the present invention is not limited to the embodiment described above. The present invention can be modified in various ways without departing from its gist.

In the embodiment described above, an example is shown in which the input data generation system 10 combines the molecular graphs of two components to generate molecular graph data and a feature vector relevant thereto. However, the input data generation system 10 may function to combine the molecular graphs of three or more components together with their mixing rates.

In addition, the predetermined conversion rule set in the vector conversion unit 14 of the input data generation system 10 may be another rule. For example, the feature vector itself may be acquired by using machine learning based on the similarity of atoms or bonds. For example, the feature vector may be acquired as a distributed representation by using a method similar to Word2Vec, which is a neural network used when vectorizing words in natural language processing. In addition, the generation of the feature vector may be performed together with the learning phase by the training unit 20.

The processing procedure of the input data generation method executed by at least one processor is not limited to the example in the embodiment described above. For example, some of the steps (processes) described above may be omitted, or the steps may be executed in a different order. In addition, any two or more steps among the above-described steps may be combined, or a part of each step may be modified or deleted. Alternatively, other steps may be executed in addition to each of the above steps. For example, the processing of steps S7 and S8 may be omitted.

In the present disclosure, the expression "at least one processor performs a first process, performs a second process, . . . , and performs an n-th process" or the expression corresponding thereto shows a concept including a case where an operator (that is, a processor) of n processes from the first process to the n-th process changes on the way. That is, this expression shows a concept including both a case where all of the n processes are performed by the same processor and a case where the processor is changed according to an arbitrary policy in the n processes.

INDUSTRIAL APPLICABILITY

One aspect of the present invention is to make it possible to efficiently predict the characteristics of a multi-component substance, in which a plurality of types of components are mixed, by using an input data generation system, an input data generation method, and an input data generation program.

REFERENCE SIGNS LIST

10: input data generation system, 100: computer, 101: processor, 11: acquisition unit, 12: synthesis unit, 13: addition unit, 14: vector conversion unit, 15: mixing rate reflection unit, 20: training unit, 30: predictor.

The invention claimed is:
1. An input data generation system, comprising:
at least one processor,
wherein the at least one processor is configured to:
receive at least an input of:
first molecular graph data specifying a molecular graph corresponding to a first monomer, wherein the first molecular graph data includes node information specifying a node of the molecular graph and edge information specifying an edge of the molecule graph;
second molecular graph data specifying a molecular graph corresponding to a second monomer, wherein the second molecular graph data includes node information specifying a node of the molecular graph, and edge information specifying an edge of the molecule graph; and
mixing rate data indicating a first mixing rate of the first monomer and a second mixing rate of the second monomer in a polymer alloy generated by mixing the first monomer and the second monomer;
generate synthetic molecular graph data by:
combining the node information of the first molecular graph data and the node information of the second molecular graph data to generate a node set data;
combining the edge information of the first molecular graph data and the edge information of the second molecular graph data to generate an edge set data; and
combining the node set data and the edge set data;
convert the synthetic molecular graph data into a feature vector;
generate input data for a neural network having a graph as its input:
by reflecting the mixing rate data on elements of the feature vector corresponding to the node information and the edge information of the first molecule graph data; and
by reflecting the mixing rate data on elements of the feature vector corresponding to the node information and the edge information of the second molecule graph data;
input the input data to the neural network to generate a prediction result of thermal properties, mechanical properties, or adhesiveness of the polymer alloy; and
output the prediction result.
2. The input data generation system according to claim 1, wherein the at least one processor is configured to multiply, add or connect the mixing rate of each of the first molecule monomer and second molecule monomer to the vector corresponding to the node information of the first molecular graph data and the second molecular graph data.

3. The input data generation system according to claim 1, wherein the at least one processor is configured to multiply, add or connect the mixing rate of each of the first molecule monomer and second molecule monomer to the vector corresponding to the edge information of the first molecular graph data and the second molecular graph data.
4. The input data generation system according to claim 1, wherein the at least one processor is further configured to:
receive, as the first molecular graph data and the second molecular graph data, bondable node information specifying nodes of a molecular graph that can be bonded to each other;
generate additional edge information regarding an edge bonding two nodes among nodes indicated by the bondable node information included in the first molecular graph data and nodes indicated by the bondable node information included in the second molecular graph data;
generate the synthetic molecular graph data by adding the additional edge information; and
generate the input data by reflecting the mixing rate of each of the first monomer and the second monomer on a vector corresponding to the additional edge information in the feature vector.
5. The input data generation system according to claim 1, wherein the first monomer and the second monomer are monomers, and
the mixing rate data indicates a mixing rate of each of the first monomer and the second monomer in a polymer alloy generated based on the first monomer and the second monomer.
6. An input data generation method executed by a computer including at least one processor, the method comprising:
receiving at least an input of:
first molecular graph data specifying a molecular graph corresponding to a first monomer, wherein the first molecular graph data includes node information specifying a node of the molecular graph and edge information specifying an edge of the molecule graph;
second molecular graph data specifying a molecular graph corresponding to a second monomer, wherein the second molecular graph data includes node information specifying a node of the molecular graph, and edge information specifying an edge of the molecule graph; and
mixing rate data indicating a first mixing rate of the first monomer and a second mixing rate of the second monomer in a polymer alloy generated by mixing the first monomer and the second monomer;
generating synthetic molecular graph data by:
combining the node information of the first molecular graph data and the node information of the second molecular graph data to generate a node set data;
combining the edge information of the first molecular graph data and the edge information of the second molecular graph data to generate an edge set data; and
combining the node set data and the edge set data;
converting the synthetic molecular graph data into a feature vector;

generating input data for a neural network having a graph as its input:
  by reflecting the mixing rate data on elements of the feature vector corresponding to the node information and the edge information of the first molecule graph data; and
  by reflecting the mixing rate data on elements of the feature vector corresponding to the node information and the edge information of the second molecule graph data;
inputting the input data to the neural network to generate a prediction result of thermal properties, mechanical properties, or adhesiveness of the polymer alloy; and
outputting the prediction result.

7. A non-transitory computer-readable storage medium storing an input data generation program causing a computer to execute:
  receiving at least an input of:
    first molecular graph data specifying a molecular graph corresponding to a first monomer, wherein the first molecular graph data includes node information specifying a node of the molecular graph and edge information specifying an edge of the molecule graph;
    second molecular graph data specifying a molecular graph corresponding to a second monomer, wherein the second molecular graph data includes node information specifying a node of the molecular graph, and edge information specifying an edge of the molecule graph; and
    mixing rate data indicating a first mixing rate of the first monomer and a second mixing rate of the second monomer in a polymer alloy generated by mixing the first monomer and the second monomer;
  generating synthetic molecular graph data by:
    combining the node information of the first molecular graph data and the node information of the second molecular graph data to generate a node set data;
    combining the edge information of the first molecular graph data and the edge information of the second molecular graph data to generate an edge set data; and
    combining the node set data and the edge set data;
  converting the synthetic molecular graph data into a feature vector;
  generating input data for a neural network having a graph as its input:
    by reflecting the mixing rate data on elements of the feature vector corresponding to the node information and the edge information of the first molecule graph data; and
    by reflecting the mixing rate data on elements of the feature vector corresponding to the node information and the edge information of the second molecule graph data;
  inputting the input data to the neural network to generate a prediction result of thermal properties, mechanical properties, or adhesiveness of the polymer alloy; and
  outputting the prediction result.

\* \* \* \* \*